(12) United States Patent
Abari et al.

(10) Patent No.: US 11,860,307 B2
(45) Date of Patent: Jan. 2, 2024

(54) APPARATUS AND METHOD FOR A BEAM-DIRECTING SYSTEM USING A GATED LIGHT VALVE

(71) Applicant: Woven by Toyota, U.S., Inc., Palo Alto, CA (US)

(72) Inventors: Farzad Cyrus Foroughi Abari, San Bruno, CA (US); Nathan Rolander, Menlo Park, CA (US); Romain Clément, Campbell, CA (US)

(73) Assignee: Woven by Toyota, U.S., Inc., Palo Alto, CA (US)

( * ) Notice: Subject to any disclaimer, the term of this patent is extended or adjusted under 35 U.S.C. 154(b) by 174 days.

(21) Appl. No.: 17/243,334

(22) Filed: Apr. 28, 2021

(65) Prior Publication Data
US 2022/0018939 A1 Jan. 20, 2022

Related U.S. Application Data

(63) Continuation of application No. 15/858,284, filed on Dec. 29, 2017, now Pat. No. 11,022,679.

(51) Int. Cl.
| | |
|---|---|
| *G01S 7/481* | (2006.01) |
| *G02B 6/42* | (2006.01) |
| *G01S 17/42* | (2006.01) |
| *G02B 6/06* | (2006.01) |
| *G01S 17/931* | (2020.01) |

(52) U.S. Cl.
CPC .......... *G01S 7/4814* (2013.01); *G01S 7/4812* (2013.01); *G01S 7/4818* (2013.01); *G01S 17/42* (2013.01); *G02B 6/4246* (2013.01); *G02B 6/4298* (2013.01); *G01S 7/4817* (2013.01); *G01S 17/931* (2020.01); *G02B 6/06* (2013.01)

(58) Field of Classification Search
CPC .... G01S 7/4814; G01S 7/4812; G01S 7/4818; G01S 17/42; G01S 17/931; G02B 6/4246; G02B 6/4298; G02B 6/06
USPC ....................................... 356/4.01
See application file for complete search history.

(56) References Cited

U.S. PATENT DOCUMENTS

| | | |
|---|---|---|
| 6,664,706 B1 | 12/2003 | Hung et al. |
| 6,900,425 B1 | 5/2005 | Aliev et al. |
| 7,346,245 B2 | 3/2008 | Terakawa et al. |
| 7,532,311 B2 * | 5/2009 | Henderson ............... G01S 17/89 356/28 |
| 10,564,266 B2 * | 2/2020 | O'Keeffe ............... G01S 17/931 |
| 2020/0249324 A1 | 8/2020 | Steinberg et al. |

* cited by examiner

*Primary Examiner* — Daniel L Murphy
(74) *Attorney, Agent, or Firm* — Christopher G. Darrow; Darrow Mustafa PC

(57) ABSTRACT

In one embodiment, an apparatus includes a first stage and a second stage. The first stage may include a micro light-directing unit that is operable to receive a light beam from a light source and direct the light beam along one dimension to discrete input locations of a second stage. The second stage may be operable to receive the light beam from the first stage at the discrete input locations along the one dimension and direct the light beam through two dimensions to discrete output locations of the second stage to scan a three-dimensional space.

18 Claims, 8 Drawing Sheets

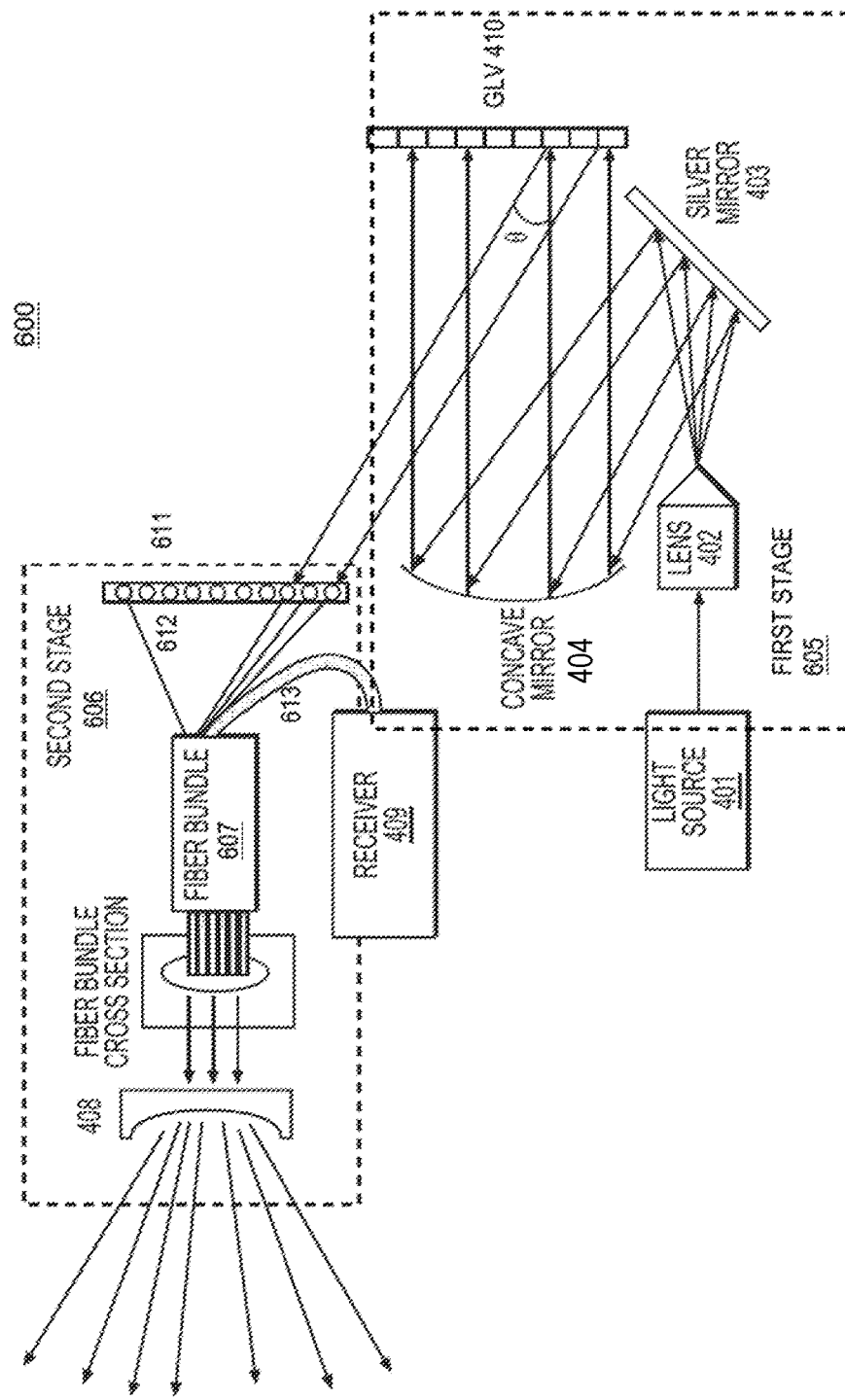
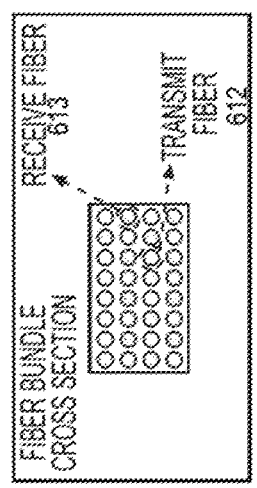
FIG. 6A
FIG. 6B

APPARATUS AND METHOD FOR A BEAM-DIRECTING SYSTEM USING A GATED LIGHT VALVE

PRIORITY

This application is a continuation under 35 U.S.C. § 120 of U.S. patent application Ser. No. 15/858,284, filed Dec. 29, 2017, which is incorporated herein by reference.

BACKGROUND

Light Detection and Ranging (LIDAR) is a sensing method that uses a light beam to measure the distance to various objects. A LIDAR instrument works by emitting a light beam out into the world and measuring the time it takes to return. The return time for each return light beam is combined with the location of the LIDAR instrument to determine a precise location of a surface point of an object. This location is recorded as a three-dimensional point in space, i.e., azimuth, elevation, and range. In some lidars, the Doppler information from the target is acquired, providing a 4D data point. Several recorded three-dimensional points may provide an accurate three-dimensional representation of the environment surrounding the LIDAR instrument. This three-dimensional representation may be referred to as a point cloud. A LIDAR system typically includes a light source, a receiver, a mirror that rotates or tilts on a gimbal, timing electronics, a Global Positioning System (GPS), and an Inertial Measurement Unit (IMU). Traditional LIDAR systems may be slower and have lower resolution than what is needed for at least some autonomous vehicle applications. Also, traditional LIDAR systems may be prone to drift and calibration errors caused by vibrations inherent in vehicular movement.

BRIEF DESCRIPTION OF THE DRAWINGS

FIG. 6A illustrates an example beam-directing system that uses a GLV in conjunction with a fiber bundle to direct light in a three-dimensional space.
FIG. 6B illustrates an example fiber bundle cross-section.

DESCRIPTION OF EXAMPLE EMBODIMENTS

Figure 1A:
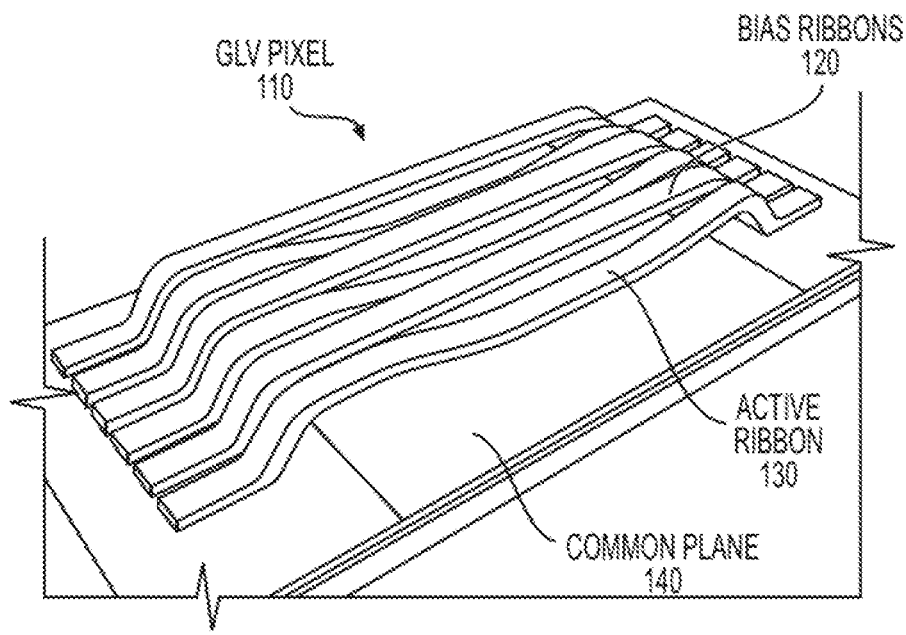
FIG. 1A illustrates an example grated light valve (GLV).

Traditional LIDAR systems may use a mechanical gimbal and a mirror to steer light beams into space. In a traditional LIDAR system, light is emitted from a light source toward a mirror that can rotate in 360° and reflect the light pulses in several directions around the LIDAR instrument. Such LIDAR instruments are bulky, slow, susceptible to thermal and vibrational drift, and provide a lower resolution than what may be needed for precise object recognition and imaging. As an example and not by way of limitation, when a traditional LIDAR instrument is mounted onto an autonomous vehicle, the motion of the vehicle along with wide-ranging temperature differences that can occur in a single day may cause the gimbal and mirror arrangement to deform and lose accuracy over time. This may require the LIDAR instrument to be repaired, recalibrated, or even replaced, which may be costly and aggravating to consumers.

In particular embodiments, a beam-directing system may use a micro-electromechanical system (MEMS) device called a grated light valve (GLV) and the principle of light diffraction to direct a light beam in a two-dimensional space. The beam-directing system may have two stages. The first stage may include a light source that emits a light beam onto a GLV. The GLV may direct the light beam along one dimension to discrete input locations of a second stage. The second stage may include a mechanism whereby the input light beam is directed through two dimensions to discrete output locations. This may enable the beam-directing system to scan a three-dimensional space without the use of a gimbaled mirror. In particular embodiments, the mechanism that directs the light beam through two dimensions may be a bundle of fiber-optic cables whose input ends are located at the discrete input locations and whose output ends may be pointed in several different directions.

The beam-directing system may have several advantages over traditional LIDAR systems. The beam-directing system requires very few moving parts, which may create a more robust sensing system and reduce or eliminate the need for maintenance or replacement of system components. Also, because particular embodiments of the beam-directing system do not require the rotation or tilting of cumbersome mirrors, the beam-directing system may be able to scan faster than traditional LIDAR systems and thus sense nearby objects more quickly or provide a higher refresh rate.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described. In addition, the embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g., method, can be claimed in another claim category, e.g., system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1B:
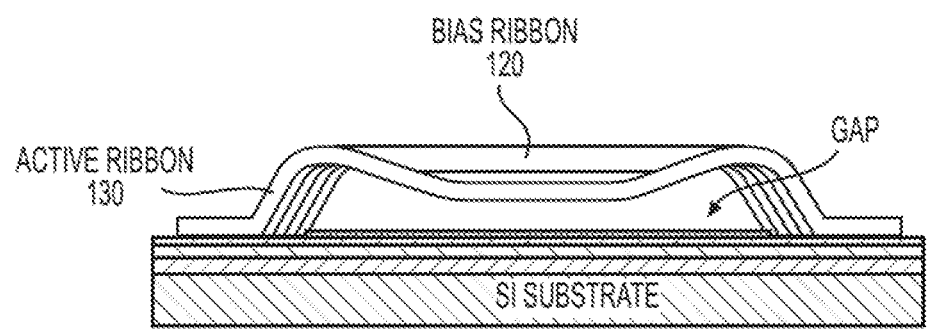
FIG. 1B illustrates another view of an example GLV.

FIGS. 1A and 1B illustrate an example grated light valve (GLV). A GLV may operate by using an adjustable diffraction grating. A GLV may be constructed on a silicon wafer (e.g., common plane 140) and may include several parallel rows of reflective micro-ribbons suspended above an air gap. A group of ribbons arranged on a substrate may be referred to as a "pixel." A given GLV pixel 110 may include several bias ribbons 120 and several active ribbons 130. The bias ribbons and the active ribbons may be arranged such that every other ribbon is an active ribbon that can be depressed slightly by applying a voltage between the ribbons and a base conductor. The voltage may create an electric field that causes the active ribbons to deflect downward toward the common plane 140 while the bias ribbons remain stationary. This deflection of every other ribbon creates a square-well diffraction grating between each bias ribbon 120 and each active ribbon 130. A square-well diffraction grating diffracts light into fixed diffraction angles. The depth of the square-well diffraction grating depends on how far the active ribbons 130 are deflected, which in turn depends on the amount of voltage applied to the ribbons. When a voltage is applied to alternate ribbons, the GLV is set to a diffraction state. The source light is then diffracted at set angles. When the depth of the square-well diffraction grating is ¼th of the light's wavelength, the entire specular beam is converted into diffracted light that diffracts off the GLV at a specific angle.

Figure 2:
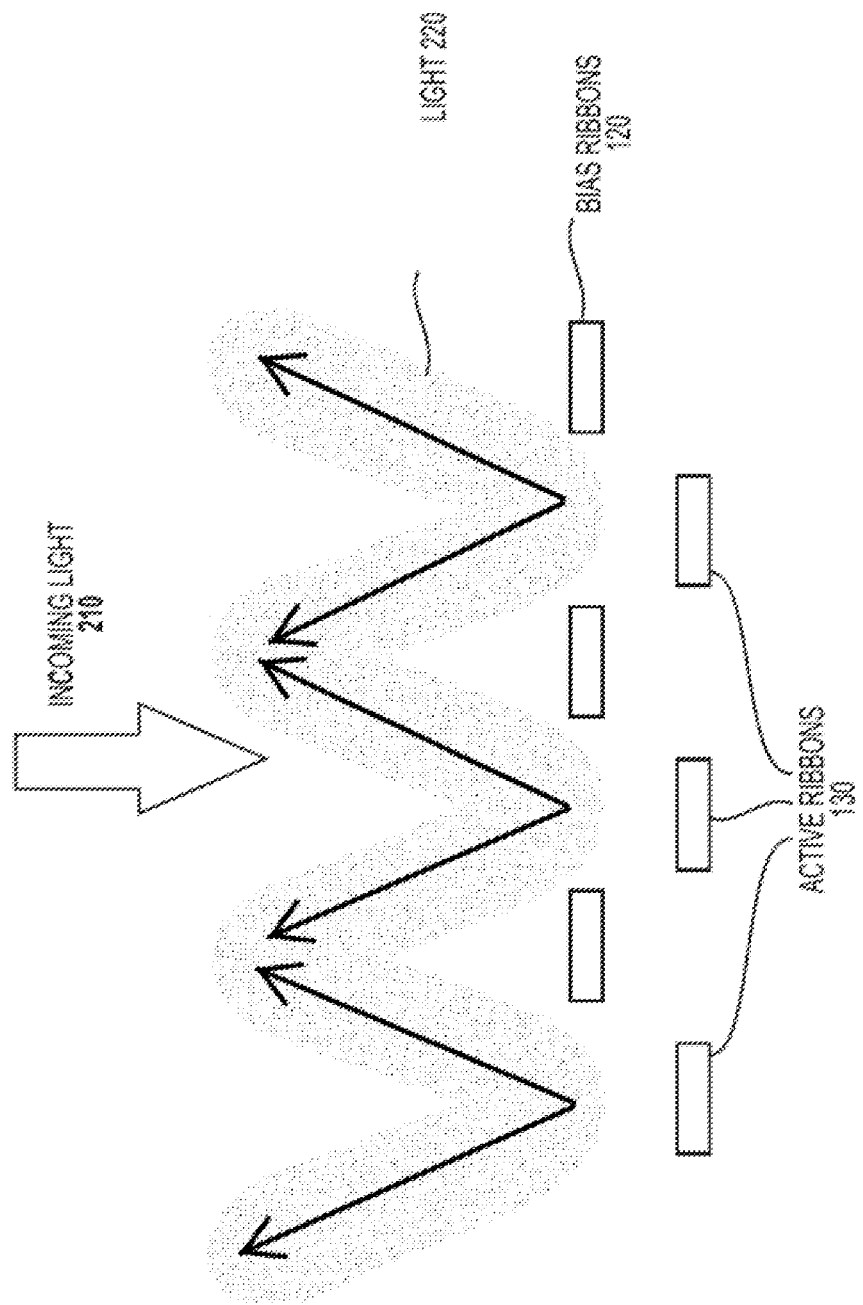
FIG. 2 illustrates a cross-section of a GLV depicting an example path for diffracted light.

FIG. 2 illustrates a cross-section of a GLV pixel depicting an example path for diffracted light. A voltage is applied to the active ribbons 130 causing them to deflect downward while bias ribbons 120 remain stationary. This configuration may be understood to be the "on" or activated configuration. As mentioned above, this deflection of every other ribbon creates a square-well diffraction grating between each bias ribbon 120 and each active ribbon 130. Incoming light 210 is impinged directly onto the GLV pixel. When light passes through a narrow slit, it is diffracted. The incoming light 210 reflects off the active ribbons, but as the light passes the narrow slit created by the bias ribbons, the light may be diffracted so that it comes off the GLV pixel at an angle that is different than the angle at which it impinged on the pixel. The distance between the bias ribbons and the active ribbons may be ¼th of the light's wavelength so that all of the incoming light may be diffracted. If the depth of the square-well diffraction grating is more or less than ¼th of the light's wavelength, the intensity of the diffracted light 220 may change. In particular embodiments, the changing angle of diffracted light may be used to direct the beam to a particular point. If no voltage is applied to the active ribbons, the surfaces of the ribbons may function together as a mirror.

In particular embodiments, when a GLV pixel is activated, the active ribbons are deflected. The resulting square-well diffraction grating may introduce phase offsets between the wave fronts of light reflected off the bias ribbons and the active ribbons. The functional dependence of the first-order diffraction lobes is $$I_{1st} = I_{max}\sin^2\left(\frac{2\pi d}{\lambda}\right),$$

where $I_{max}$ is the maximum first order diffracted intensity (where d=λ/4), d is the grating depth, and λ is the wavelength of the incoming light. By varying the voltage applied to the active ribbons, it is possible to control the grating depth at each pixel. Thus, it may be possible to control the proportion of light that is reflected or diffracted, as well as the angles of diffraction, which may occur at discrete angles.

Figure 3:
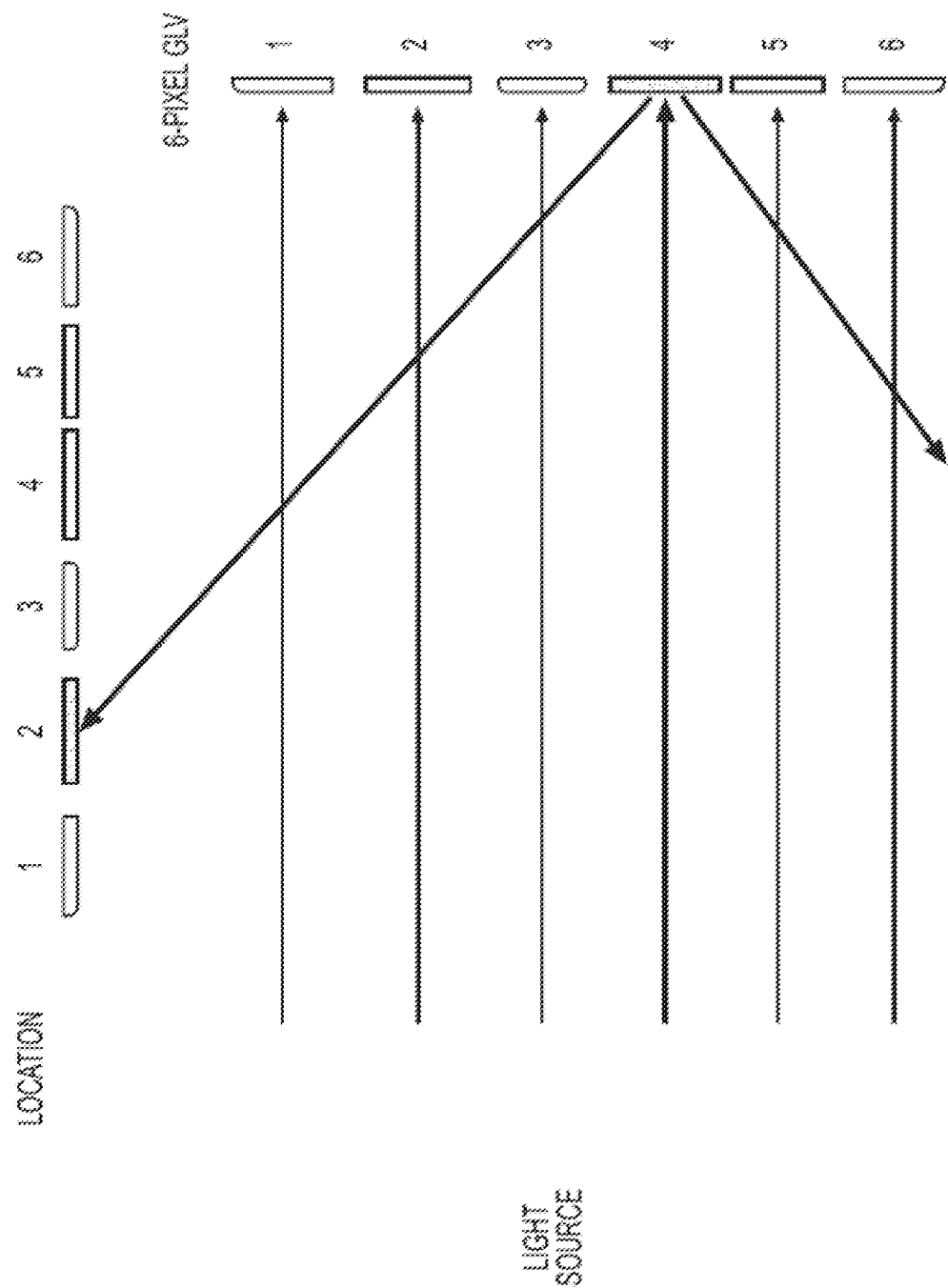
FIG. 3 illustrates another example diagram for directing light using an example GLV.

FIG. 3 illustrates an example diagram for directing light using an example six-pixel GLV. A stationary light source may direct a light beam at the GLV. In this example drawing, the six arrows pointing from left to right may represent a single light beam. The example diagram of FIG. 3 also includes six discrete locations 1-6 along the top of the figure. By activating different pixels, it is possible to direct the light beam onto any of the six locations. As an example and not by way of limitation, a controller may activate pixel 4 by applying a voltage to the active ribbons of that pixel, as discussed above. Pixels 1-3, 5, and 6 may be left deactivated. When the light beam impinges on pixel 4, it may be diffracted at an angle such that it is directed toward location 2 along the top of the figure. When the light beam impinges on the deactivated pixels, the light is simply reflected back like a mirror. As another example and not by way of limitation, the controller may direct a light beam onto location 5 by activating pixel 2. By activating and deactivating different pixels, it is possible to direct the light into any of the six locations. Although the example GLV only has six pixels, this is for illustration purposes only. GLVs typically have between 1,024 pixels and 8,192 pixels. Thus, by activating different pixels on a 1,024 pixel GLV, it is possible to direct the light beam into 1,024 discrete locations. Likewise, by activating different pixels on an 8,192 pixel GLV, it is possible to direct the light beam into 8,192 discrete locations. Because voltage is applied to each pixel independently, each pixel of the GLV operates independently. This may allow for fast transitions from one location to another, even if the locations are far apart. As an example and not by way of limitation, directing light from position 1 to position 2 may take the same amount of time as directing light from position 1 to position 1,024. This provides an advantage over traditional LIDAR systems, which require the gimbaled mirror to pass through every intervening position when transitioning from one position to another. Another advantage of GLV pixel activation includes the ability to change the scan pattern very quickly and without altering the mechanical setup of the hardware.

When all but one or relatively few pixels are deactivated, most of the light beam emitted from light source 401 is lost. This is because only the activated pixels direct light to the discrete input locations. This means that all the light that impinges on the deactivated pixels is reflected back toward the light source or to an optical trap. In particular embodiments, at any given time, most of the pixels may be deactivated and thus most of the light may be lost. To save power consumption, one of two methods may be used. First, in particular embodiments a dynamic phase array may be used on the GLV. The phase of the light wave emitted from the light source may be controlled using an optical phase array. Controlling the phase of the light wave may enable most (if not all) of the incoming light beam to be aimed at a particular location by means of constructive interference.

Second, instead of completely turning off the inactive pixels, the controller may modulate each pixel. In this embodiment, instead of losing the majority of the power due to deactivated pixels being totally "off," the controller may modulate each pixel independently of the other pixels. The controller may assign a unique (e.g., orthogonal) random sequence to each pixel. Then, at the receiver side, the receiver or other appropriate computing device may separate the received signals by matched filtering. In other words, the system may transmit a signal by activating several pixels simultaneously, each transmitting its own unique random sequence. The receiver may receive this signal (which includes light beams from several pixels) and separate each beam by convolving the received signal between each of the random sequence patterns. As an example and not by way of limitation, a signal may include a first random sequence from pixel 1 that is "01101" and the same signal may also include a second random sequence from pixel 2 that is "11001." The receiver may receive a return signal that has the sequence "0110111001." The receiver (or other suitable computing device) may separate this signal into its two pixel-generated light beams: "01101" and "11001." In particular embodiments, the receiver will receive a superimposed signal originating from reflections from two separate lasers. Due to the orthogonality of the transmit beams, they can be separated at the receiver. In particular embodiments, the information in each light beam may then be collected and processed. This random modulation may not require any extra hardware. Using this method, at least some extra light generated by light source 401 may be used to transmit information, instead of being wasted.

Figure 4:
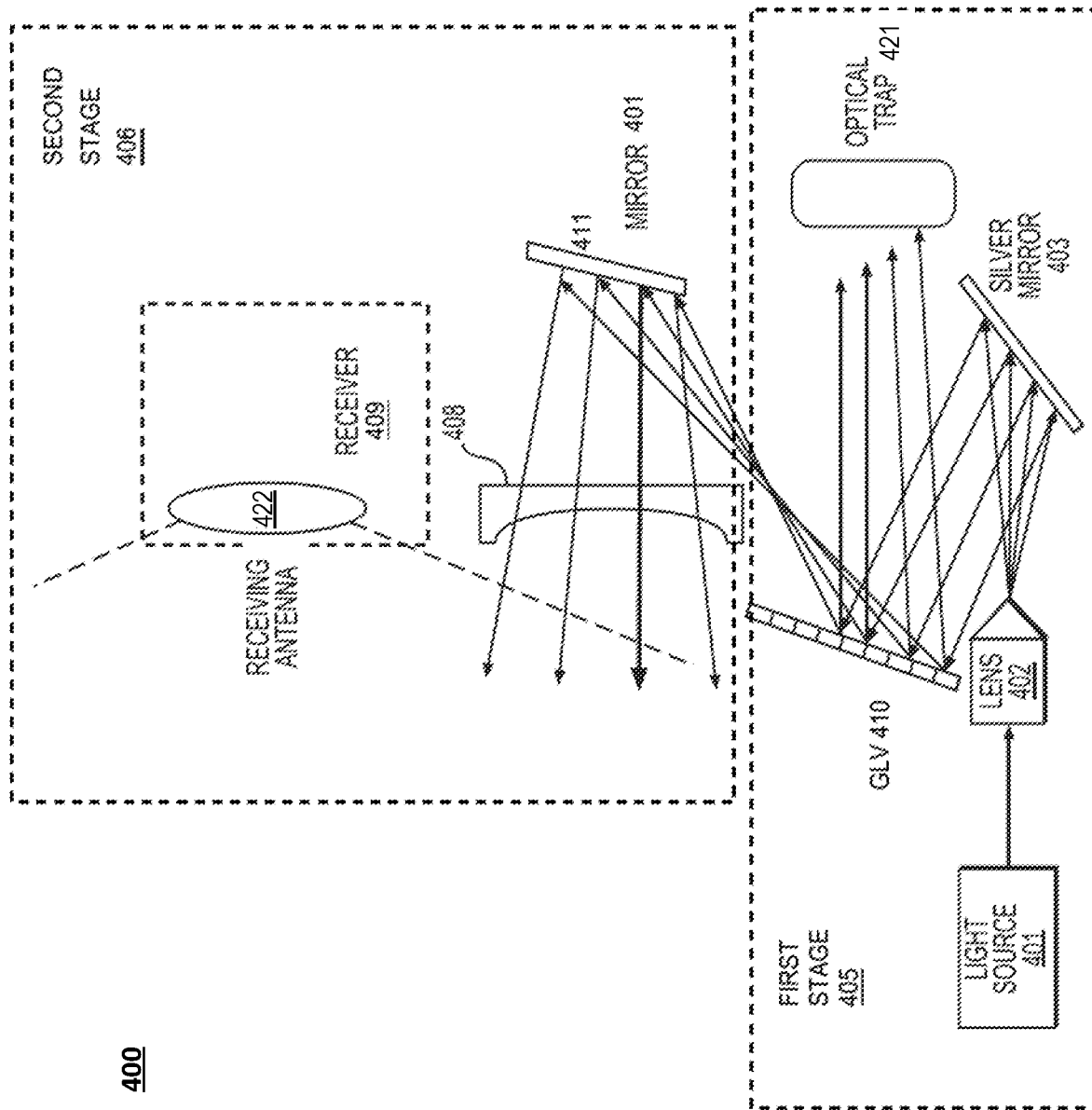
FIG. 4 illustrates an example beam-directing system that uses a GLV in conjunction with a rotating mirror to direct light in a three-dimensional space.

FIG. 4 illustrates an example beam-directing system 400 that uses a GLV 410 in conjunction with a gimbaled mirror 401 to direct light in a two-dimensional space. A limitation of the GLV described thus far is that it may only diffract light along one dimension. This may be beneficial in directing light to discrete points along a one-dimensional path, but if it is desired to direct light in two or three dimensions, a second stage may be added. The beam-directing system may include a first stage 405 and a second stage 406. The first stage may include a light source 401, a lens 402, a silver mirror 403, a concave mirror 404, and a GLV 405.

Light source 401 may be any suitable light source used in current LIDAR systems. As an example and not by way of limitation, the light source 401 may be a randomly modulated continuous wave laser. A laser such as this may be suitable because it may transmit light pulses at random, which may enable the light source to transmit one or more light beams before a previously emitted beam is received. Two light beams simultaneously transmitted with two different random codes may enable a computing device associated with the beam-directing system 400 to differentiate between the two light beams. Such a light source both speeds up scanning and reduces interference.

Lens 402 may be any suitable lens for spreading a light beam. As an example and not by way of limitation lens 402 may be a Powell lens, which may emit light that is spread uniformly throughout its associated fan angle. Other circular or Gaussian lenses may be suitable for the beam-directing system 400 as well. The silver mirror 403 and concave mirror 404 may be useful for optical beam manipulation. They may enable a shorter optical path so that the entire length of the GLV may be impinged with light while the dimensions of the first stage of beam-directing system 400 remain relatively small. Lens 402, silver mirror 403 and concave mirror 404 may ensure that the light beam is impinged onto the GLV 410 in a direct and uniform fashion. GLV 410 may diffract light according to the process described above with regard to FIGS. 2 and 3.

In particular embodiments, a controller may activate the desired pixel of GLV 410 to direct the light beam toward the second stage 406 and onto the desired input locations 411. In particular embodiments, there may be an equal number of input locations 411 to the number of pixels in the GLV. As an example and not by way of limitation, if the GLV has 1,024 pixels, there may be 1,024 input locations. The input locations 411 may be arranged along a line in one dimension. For example, the line may be along the surface of the gimbaled mirror 401. Here, the second stage may include the gimbaled mirror 401 and optionally lens 408. Light may be diffracted off GLV 410 at discrete points. These diffracted light beams may impinge on the gimbaled mirror along a one-dimensional line. The gimbaled mirror may then rotate or otherwise tilt in several directions along a second dimension to reflect the light beams out into a three-dimensional space surrounding the beam-directing system 400. In particular embodiments the gimbaled mirror may tilt perpendicular to the one-dimensional line on which the diffracted light beams are impinged on the mirror.

As an example and not by way of limitation, the light beams may diffract off the GLV along a vertical line. In this example, the light beams may impinge on the mirror at different locations along a vertical line that covers at least part of the surface of the mirror. The mirror may tilt horizontally left and right, which is perpendicular to the vertical line. Thus, the gimbaled mirror 401 may operate as a second stage whereby it reflects the light beams from the first stage (e.g., GLV 410) and directs the light beams through two dimensions to discrete output locations. This may allow the beam-directing system 400 to scan a three-dimensional space. Beam-directing system 400 may also include an optical trap 421 which may catch the light that reflects off the un-activated pixels of the GLV. Alternatively, an optical trap may not be provided. An optical trap may be an apparatus that receives the light that is diffracted off the GLV but not in the direction of the desired input locations 411. Referring to FIGS. 2 and 3, the GLV diffracts light in two directions. According to particular embodiments described herein, some of the light is diffracted in the direction of a desired input location 411, and some of the light is diffracted away from the desired input location (this will be referred to as "stray light beams"). This is a natural consequence of using GLVs to steer laser beams. To reduce the likelihood of stray light beams interfering with the LIDAR system, the optical trap may absorb the stray light beams instead of reflecting them. This may ensure that the only light that leaves the LIDAR system travels through the second stage 406.

An advantage of beam-directing system 400 over the other systems discussed below may be the wide availability of a suitable gimbaled mirror. Gimbaled mirrors are often available as an off-the-shelf part, whereas the fiber-optic cable bundles (discussed below) of beam-directing system 500 and 600 may require customized positioning. Thus, beam-directing system 400 may be set up and installed more quickly and affordably than beam-directing systems 500 or 600. If a user is more concerned with fast and easy setup than with robustness, scanning speed, or aerodynamics, the user may consider using beam-directing system 400.

Figure 5:
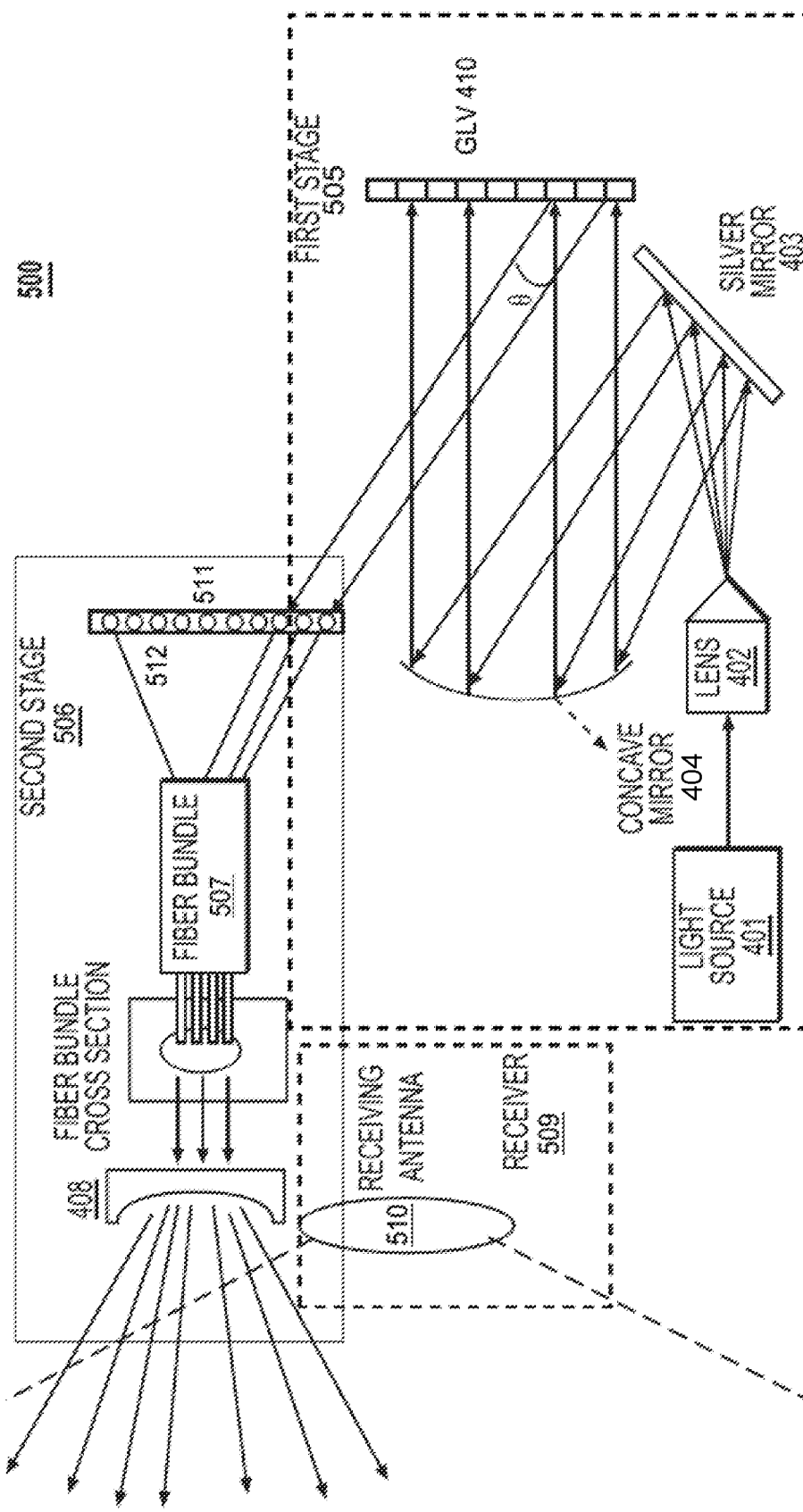
FIG. 5 illustrates an example beam-directing system that uses a GLV in conjunction with a fiber bundle and receiving antenna to direct light in a three-dimensional space.

FIG. 5 illustrates another example beam-directing system that uses a GLV in conjunction with a fiber bundle to direct light in a three-dimensional space. Beam-directing system 500 may include some of the same components as beam-directing system 400 and operate in substantially the same manner, except that instead of using a gimbaled mirror to direct the beam in two-dimensions, the beam-directing system 500 may use transmit fiber-optic cables 512.

In particular embodiments, a controller may activate the desired pixel of GLV 410 to direct the light beam toward the second stage 506 and onto the desired input locations 511.

In particular embodiments, there may be an equal number of input locations 511 to the number of pixels in the GLV. As an example and not by way of limitation, if the GLV has 1,024 pixels, there may be 1,024 input locations. The input locations 511 may be arranged along a line in one dimension. At least some of, and in particular embodiments, each of the input locations 511 may be coupled to a transmit fiber-optic cable 512. Even though only four transmit fiber-optic cables are illustrated as being coupled to the input locations 511, this is to simplify the drawings and allow space for adequate notation. This disclosure contemplates a GLV with any number of pixels, a second stage with any number of corresponding input locations, and a fiber bundle with any number of corresponding fiber-optic cables coupled to a different input location. For example, the first stage GLV may have 1,024 up to 8,192 pixels, the second stage may have from 1,024 up to 8,192 input locations 511, and a fiber bundle may have from 1,024 up to 8,192 fiber-optic cables that are each coupled to a different input location.

The transmit fiber-optic cable 512 may have a transmit-input end (coupled to one of the input locations 511) and a transmit-output end, which may emit the beam into the environment that surrounds the beam-directing system 500. Lens 408 may act to spread the emitted light beams into a wider space. Each transmit fiber-optic cable 512 may be part of a fiber bundle 507. Each transmit-output end of a transmit fiber-optic cables 512 may be positioned in any suitable direction. In contrast to the arrangement of transmit-input ends, the transmit-output ends need not all be facing in the same direction. As an example and not by way of limitation, a first transmit-output end may be directed to the left, away from the GLV, and a second transmit-output end may be directed in the opposite direction, pointed toward the right. By arranging each transmit-output end in a different direction, it may be possible to emit light beams in e.g., 1,024 discrete directions in a two-dimensional (or three-dimensional) space. In particular embodiments, the light beams may be directed in a 360° area around the beam-directing system 600 without requiring a gimbaled mirror. Indeed, the only moving parts in the entire beam-directing system 400 may be the microscopic deflection of active ribbons 130 when a voltage is applied to the pixel. Thus, the transmit fiber-optic cables 612 may operate as a second stage whereby they receive the light beams from the first stage (e.g., GLV 410) and direct the light beams through two (or three) dimensions to discrete output locations. This may allow the beam-steering system 500 to scan a two- or three-dimensional space with fewer moving parts than traditional LIDAR systems. Very few or no moving parts on the transmit-side in the LIDAR scanning system creates a more robust sensing system and reduces the need for maintenance or replacement of system components. Also, a LIDAR scanning system that does not require the rotation or tilting of cumbersome mirrors allows for faster scanning than traditional LIDAR systems. Fast scanning may enable the system to sense nearby objects more quickly or provide a higher refresh rate.

Figure 7:
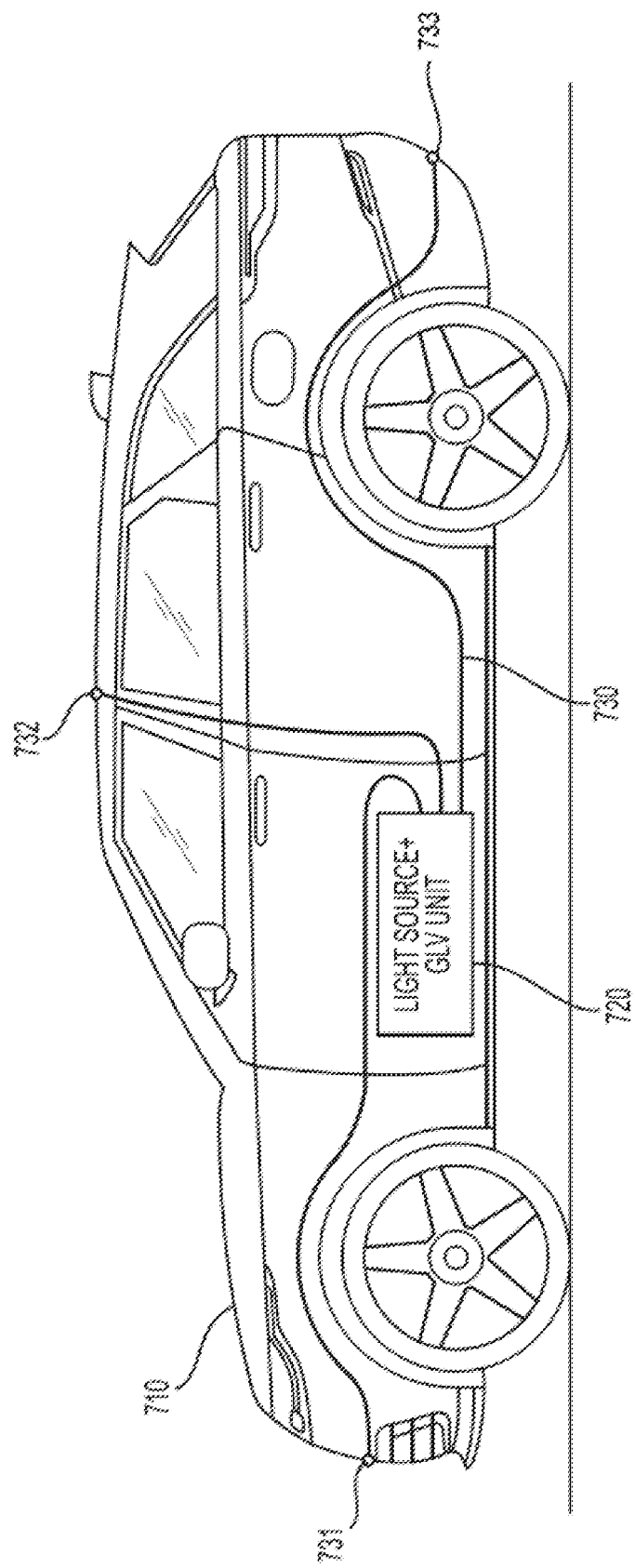
FIG. 7 illustrates an example beam-directing system installed in an example autonomous vehicle.

In beam-directing system 500, receiving the return light beams may be accomplished by a receiver 509 which may share many of the same components as receiver 409 from FIG. 4. Comparing to FIG. 6A, one main difference may be that receiver 509 includes receiving antenna 510, whereas in FIG. 6A, reception is accomplished through receive fiber-optic cables 613. Receiver 509 and receiving antenna 510 may have the advantage of easier installation on existing vehicles, because it may be more difficult and time-consuming to install receive fiber-optic cables (e.g., 613 in FIG. 6A) than a receiving antenna 510. Receive fiber-optic cables (e.g., 613 in FIG. 6A) may have the advantage of helping the car to be more sleek and aerodynamic, because the fiber-optic cables need only extend to the surface of the vehicle (as illustrated in FIG. 7). This may save on energy costs, may also protect the LIDAR system since no pieces are outside the vehicle like they are in traditional LIDAR systems. The transmit fiber-optic cables (e.g., 612 in FIG. 6A) may be arranged in in such a way as to ensure even distribution of emitted light beams. This disclosure contemplates any suitable arrangement of transmit fiber-optic cables (e.g., 613 in FIG. 6A).

Although several components are shown in FIG. 5, not all components may be necessary for operation of the beam-directing system 500. As an example and not by way of limitation, lens 402, silver mirror 403, concave mirror 404, and lens 408 may be removed without defeating the essential functioning of beam-directing system 500. The required components for beam-directing system 400 to operate properly may be light source 401, receiver 509, antenna 510, GLV 410, and the transmit fiber-optic cables 512.

FIG. 6A illustrates an example beam-directing system 600 that uses a GLV in conjunction with a fiber bundle to direct light in a two- or three-dimensional space. Beam-directing system 600 may differ from beam-directing system 500 in that instead of using a receiving antenna 510 to collect the return light beams, beam-directing system 600 may use receive fiber-optic cables 613. These may serve a similar purpose as a receiving antenna (e.g., capturing return light signals), but may be structurally different in that they are fiber-optic cables and not a receiving antenna. Also, the receive ends of the receive fiber-optic cables may extend no farther than the surface of the vehicle and may require no moving parts.

Transmission of LIDAR signals may operate like the transmission of LIDAR signals in beam-directing system 500 and may have the same transmission advantages as beam-steering system 500. Beam-steering system 600 may include fiber bundle 607. Fiber bundle 607 may include both the transmit fiber-optic cables 612 as well as several receive fiber-optic cables 613. The receive fiber-optic cables 613 may receive the return light beams after they have been transmitted through transmit fiber-optic cables 612 and reflected off an object in the external environment. The receive fiber-optic cables 613 may replace the traditional LIDAR receiver antenna (e.g., receiving antenna 510). Although not illustrated in FIG. 6A, beam-directing system 600 may also include an optical trap positioned near GLV 410 such that it may catch the light that reflects off the un-activated pixels of the GLV.

Beam-directing system 600 further reduces the number of components typically included in a traditional LIDAR system. The beam-directing system may have several advantages over traditional LIDAR systems. The beam-directing system requires very few moving parts, which may create a more robust sensing system and reduce or eliminate the need for maintenance or replacement of system components. Also, because particular embodiments of the beam-directing system do not require the rotation or tilting of cumbersome mirrors, the beam-directing system may be able to scan faster than traditional LIDAR systems and thus sense nearby objects more quickly or provide a higher refresh rate. Additionally, the transmit and receive fiber-optic cables remove the need to have system components mounted outside the vehicle. This may create a more aerodynamic vehicle that saves energy through a reduction in wind resistance.

Although several components are shown in FIGS. 6A and 6B, not all components may be necessary for operation of the beam-directing system 600. As an example and not by way of limitation, lens 402, silver mirror 403, concave mirror 404, and lens 408 may be removed without defeating the essential functioning of light-directing system 600. The required components for light-directing system 600 to operate properly may be light source 401, receiver 409, GLV 410, and the transmit and receive fiber-optic cables 612 and 613 along with their respective transmit-input and transmit-output ends and receive-input and receive-output ends, where the transmit-input ends are coupled at input locations 611 and the transmit-output ends and receive-input ends are arranged in directions suitable for sensing at least part of the environment surrounding the beam-directing system 600. The receive output ends of receive fiber-optic cables 613 may be coupled to receiver 409, as illustrated in FIG. 6A.

FIG. 6B illustrates an example fiber bundle cross-section. The transmit fiber-optic cables 612 may be interspersed with the receive fiber-optic cables 613. It may generally be desirable to arrange the transmit fiber-optic cables 612 and receive fiber-optic cables 613 in such a way as to ensure even distribution of emitted light beams as well as to ensure that a sufficient number of return light beams are received by the receive fiber-optic cables 613. Although a particular arrangement of transmit fiber-optic cables 612 and receive fiber-optic cables 613 is illustrated in FIG. 6B, this disclosure contemplates any suitable arrangement of transmit fiber-optic cables 612 and receive fiber-optic cables 613.

FIG. 7 illustrates an example beam-directing system installed in an example autonomous vehicle 710. This beam-directing system may be similar to beam-directing systems 600 and may include a light source and GLV unit 720 that is located somewhere in the interior of autonomous vehicle 710. GLV unit 720 may include the components of the first stage 405 of FIGS. 4 and 5. As examples and not by way of limitation, the light source and GLV unit 720 may be positioned beneath one of the passenger seats, in the trunk of the autonomous vehicle, on the roof, or in any other suitable location. This beam-directing system may also include fiber-optic cables 730 which may be transmit fiber-optic cables, receive fiber-optic cables, or both. Their respective transmit-output ends and receive-input ends may run along the interior of the vehicle toward points 731, 732, and 733.

An advantage of beam-directing systems 400 and 500 is that the light source and GLV components (e.g., element 720) may be located in a different location in the autonomous vehicle than the transmit-output ends and receive-input ends of the transmit and receive fiber-optic cables. These locations may be remote from each other. Another advantage is the possibility of utilizing only one laser source and GLV to drive the numerous fiber-coupled antennas distributed around the vehicle. As examples and not by way of limitation, fiber optic cables 730 are illustrated in FIG. 7 as running along the interior of the autonomous vehicle toward several exterior surfaces of the vehicle. Elements 731, 732, and 733 may correspond to the transmit-output ends of the fiber-optic cables, the receive-input ends of the fiber-optic cables, or both. In particular embodiments, element 730 may correspond to sub-bundles of fiber-optic cables that comprise several fiber-optic cables. As an example and not by way of limitation, the GLV may have 1,024 pixels. A separate fiber optic cable may be coupled to each of the 1,024 possible input locations, giving the beam-directing system 1,024 fiber optic cables. Those fiber optic cables may be arranged in any suitable manner. As an example and not by way of limitation, 341 fiber-optic cables may run from the light source and GLV unit 720 toward the front of the autonomous vehicle at point 731, 341 fiber-optic cables may run toward the top of the autonomous vehicle at point 732, and 342 fiber-optic cables may run toward the back of the autonomous vehicle at point 733. The transmit-output ends and the receive-input ends of the fiber-optic cables may be fanned out at points 731, 732, 733, or otherwise arranged to scan a suitable amount of the external environment surrounding the autonomous vehicle. Although not illustrated in FIG. 7, this disclosure contemplates an autonomous vehicle 710 equipped with fiber-optic cables that emerge from the surface of the autonomous vehicle at any suitable location, including the front and rear bumpers, the side doors, the hubs, the wheels, the undercarriage of the autonomous vehicle, or any other suitable location. Moreover, although only one beam-directing system is illustrated as being installed in autonomous vehicle 710, this disclosure contemplates an autonomous vehicle having any suitable number of beam-directing systems.

In particular embodiments, a beam-directing system may use planar light valve technology (PLV) instead of a GLV. A PLV may be a two-dimensional analog of the GLV. In a PLV, pixels may be arranged in a two-dimensional, close-packed array. A PLV system may be able to modulate the amplitude or the phase of a light beam, or both the amplitude and phase simultaneously. A pixel of a PLV may include a square piston array. As an example and not by way of limitation, a pixel may include a 2×2 piston array. In contrast to the ribbons in a GLV which are thin, elongated mirrors, the pistons in a PLV may be reflective squares. The pistons may be controlled in a similar manner as the ribbons on the GLV. By applying a voltage to diagonally opposite pistons, a controller can cause the diagonally opposite pistons to deflect by ¼th the light's wavelength. Because the pistons are 2D and are laid out in a 2D fashion (as opposed to being 1D ribbons), diffracted light is emitted in two dimensions, rather than one dimension. Using a PLV in place of a GLV may reduce the need for a second stage (e.g., fiber bundle or gimbaled mirror) to direct the light into two or three dimensions. An advantage of a PLV is that PLVs provide a higher optical etendue than the other systems discussed herein.

Figure 8:
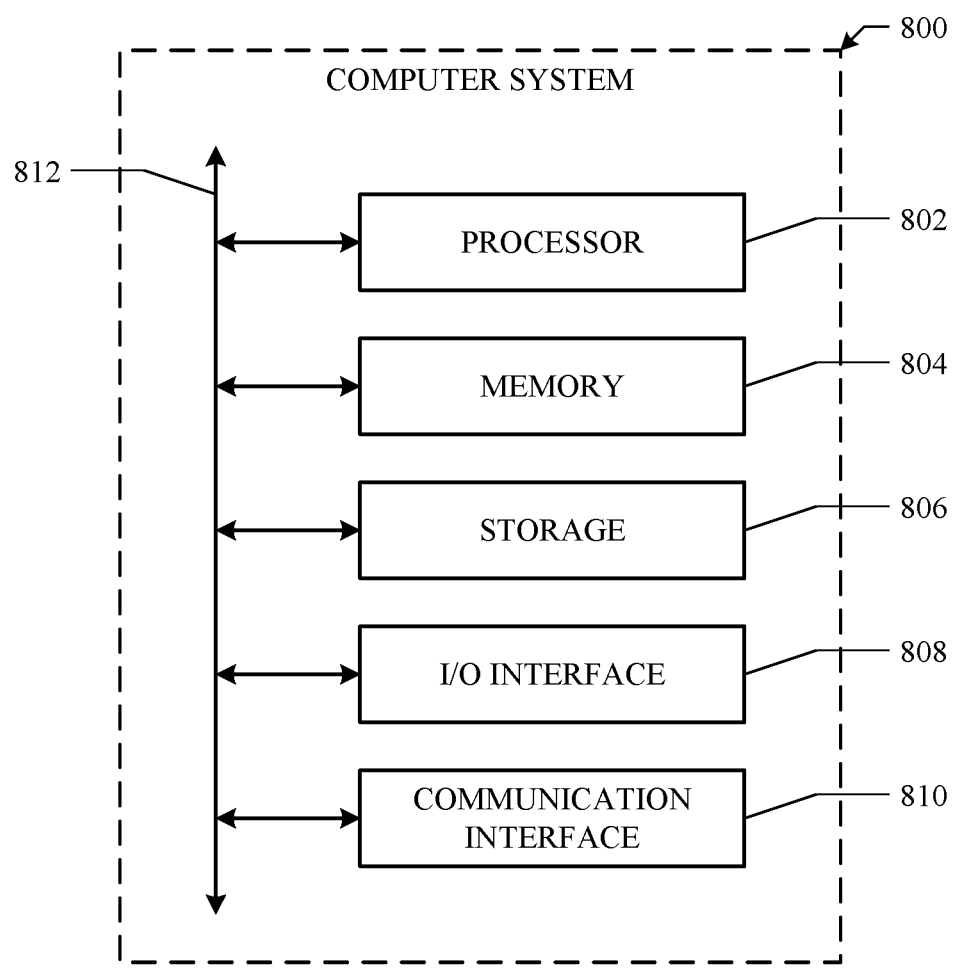
FIG. 8 illustrates an example of a computing system.

FIG. 8 illustrates an example computer system 800. In particular embodiments, one or more computer systems 800 perform one or more steps of one or more methods described or illustrated herein. In particular embodiments, one or more computer systems 800 provide functionality described or illustrated herein. In particular embodiments, software running on one or more computer systems 800 performs one or more steps of one or more methods described or illustrated herein or provides functionality described or illustrated herein. Particular embodiments include one or more portions of one or more computer systems 800. Herein, reference to a computer system may encompass a computing device, and vice versa, where appropriate. Moreover, reference to a computer system may encompass one or more computer systems, where appropriate.

This disclosure contemplates any suitable number of computer systems 800. This disclosure contemplates computer system 800 taking any suitable physical form. As example and not by way of limitation, computer system 800 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 800 may include one or more computer systems 800; be unitary or distributed; span multiple locations; span multiple machines; span multiple data centers; or reside in a cloud, which may include one or more cloud components in one or more networks. Where appropriate, one or more computer systems 800 may perform without substantial spatial or temporal limitation one or more steps of one or more methods described or illustrated herein. As an example and not by way of limitation, one or more computer systems 800 may perform in real time or in batch mode one or more steps of one or more methods described or illustrated herein. One or more computer systems 800 may perform at different times or at different locations one or more steps of one or more methods described or illustrated herein, where appropriate.

In particular embodiments, computer system 800 includes a processor 802, memory 804, storage 806, an input/output (I/O) interface 808, a communication interface 810, and a bus 812. Although this disclosure describes and illustrates a particular computer system having a particular number of particular components in a particular arrangement, this disclosure contemplates any suitable computer system having any suitable number of any suitable components in any suitable arrangement.

In particular embodiments, processor 802 includes hardware for executing instructions, such as those making up a computer program. As an example and not by way of limitation, to execute instructions, processor 802 may retrieve (or fetch) the instructions from an internal register, an internal cache, memory 804, or storage 806; decode and execute them; and then write one or more results to an internal register, an internal cache, memory 804, or storage 806. In particular embodiments, processor 802 may include one or more internal caches for data, instructions, or addresses. This disclosure contemplates processor 802 including any suitable number of any suitable internal caches, where appropriate. As an example and not by way of limitation, processor 802 may include one or more instruction caches, one or more data caches, and one or more translation lookaside buffers (TLBs). Instructions in the instruction caches may be copies of instructions in memory 804 or storage 806, and the instruction caches may speed up retrieval of those instructions by processor 802. Data in the data caches may be copies of data in memory 804 or storage 806 for instructions executing at processor 802 to operate on; the results of previous instructions executed at processor 802 for access by subsequent instructions executing at processor 802 or for writing to memory 804 or storage 806; or other suitable data. The data caches may speed up read or write operations by processor 802. The TLBs may speed up virtual-address translation for processor 802. In particular embodiments, processor 802 may include one or more internal registers for data, instructions, or addresses. This disclosure contemplates processor 802 including any suitable number of any suitable internal registers, where appropriate. Where appropriate, processor 802 may include one or more arithmetic logic units (ALUs); be a multi-core processor; or include one or more processors 802. Although this disclosure describes and illustrates a particular processor, this disclosure contemplates any suitable processor.

In particular embodiments, memory 804 includes main memory for storing instructions for processor 802 to execute or data for processor 802 to operate on. As an example and not by way of limitation, computer system 800 may load instructions from storage 806 or another source (such as, for example, another computer system 800) to memory 804. Processor 802 may then load the instructions from memory 804 to an internal register or internal cache. To execute the instructions, processor 802 may retrieve the instructions from the internal register or internal cache and decode them. During or after execution of the instructions, processor 802 may write one or more results (which may be intermediate or final results) to the internal register or internal cache. Processor 802 may then write one or more of those results to memory 804. In particular embodiments, processor 802 executes only instructions in one or more internal registers or internal caches or in memory 804 (as opposed to storage 806 or elsewhere) and operates only on data in one or more internal registers or internal caches or in memory 804 (as opposed to storage 806 or elsewhere). One or more memory buses (which may each include an address bus and a data bus) may couple processor 802 to memory 804. Bus 812 may include one or more memory buses, as described in further detail below. In particular embodiments, one or more memory management units (MMUs) reside between processor 802 and memory 804 and facilitate accesses to memory 804 requested by processor 802. In particular embodiments, memory 804 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 804 may include one or more memories 804, where appropriate. Although this disclosure describes and illustrates particular memory, this disclosure contemplates any suitable memory.

In particular embodiments, storage 806 includes mass storage for data or instructions. As an example and not by way of limitation, storage 806 may include a hard disk drive (HDD), a floppy disk drive, flash memory, an optical disc, a magneto-optical disc, magnetic tape, or a Universal Serial Bus (USB) drive or a combination of two or more of these. Storage 806 may include removable or non-removable (or fixed) media, where appropriate. Storage 806 may be internal or external to computer system 800, where appropriate. In particular embodiments, storage 806 is non-volatile, solid-state memory. In particular embodiments, storage 806 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 806 taking any suitable physical form. Storage 806 may include one or more storage control units facilitating communication between processor 802 and storage 806, where appropriate. Where appropriate, storage 806 may include one or more storages 806. Although this disclosure describes and illustrates particular storage, this disclosure contemplates any suitable storage.

In particular embodiments, I/O interface 808 includes hardware, software, or both, providing one or more interfaces for communication between computer system 800 and one or more I/O devices. Computer system 800 may include one or more of these I/O devices, where appropriate. One or more of these I/O devices may enable communication between a person and computer system 800. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 808 for them. Where appropriate, I/O interface 808 may include one or more device or software drivers enabling processor 802 to drive one or more of these I/O devices. I/O interface 808 may include one or more I/O interfaces 808, where appropriate. Although this disclosure describes and illustrates a particular I/O interface, this disclosure contemplates any suitable I/O interface.

In particular embodiments, communication interface 810 includes hardware, software, or both providing one or more interfaces for communication (such as, for example, packet-based communication) between computer system 800 and one or more other computer systems 800 or one or more networks. As an example and not by way of limitation, communication interface 810 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 810 for it. As an example and not by way of limitation, computer system 800 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 800 may communicate with a wireless PAN (WPAN) (such as, for example, a Bluetooth WPAN), a WI-FI network, a WI-MAX network, a cellular telephone network (such as, for example, a Global System for Mobile Communications (GSM) network), or other suitable wireless network or a combination of two or more of these. Computer system 800 may include any suitable communication interface 810 for any of these networks, where appropriate. Communication interface 810 may include one or more communication interfaces 810, where appropriate. Although this disclosure describes and illustrates a particular communication interface, this disclosure contemplates any suitable communication interface.

In particular embodiments, bus 812 includes hardware, software, or both coupling components of computer system 800 to each other. As an example and not by way of limitation, bus 812 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 812 may include one or more buses 812, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. An apparatus comprising:
   a first stage that comprises a grated-light valve (GLV) that includes a substrate and rows of reflective ribbons arranged over the substrate and is operable to:
      receive a light beam from a light source; and
      direct the light beam along one dimension to discrete input locations of a second stage; and
   the second stage, comprising a gimbaled mirror, and operable to:
      receive the light beam from the first stage at the discrete input locations along the one dimension; and
      direct the light beam through two dimensions to discrete output locations of the second stage to scan a three-dimensional space.

2. The apparatus of claim 1, wherein the second stage is a fiber-optic bundle comprising a plurality of transmit fiber-optic cables, each transmit fiber-optic cable comprising a transmit-input end and a transmit-output end, wherein:
   the transmit-input end of each transmit fiber-optic cable is positioned at one of the discrete input locations; and the transmit-output end of each transmit fiber-optic cable is operable to direct the light beam toward one of the discrete output locations.

3. The apparatus of claim 2, wherein the fiber-optic bundle further comprises a plurality of receive fiber-optic cables, each receive fiber-optic cable comprising a receive-input end and a receive-output end, wherein:
the receive-input end of each receive fiber-optic cable is operable to receive a reflected beam from one or more locations in the three-dimensional space; and
the receive-output end of each fiber-optic cable is coupled to a receiver.

4. The apparatus of claim 1, wherein the gimbaled mirror that is operable to tilt perpendicular to the one dimension.

5. The apparatus of claim 1, wherein the first stage further comprises a dynamic phase array that is operable to control a phase of a light wave emitted from the light source.

6. The apparatus of claim 1, wherein:
the first stage is positioned at a first location inside an autonomous vehicle; and
the second stage comprises a plurality of transmit-input ends and a plurality of transmit- output ends, wherein each transmit-output end is positioned at one of a plurality of second locations inside the autonomous vehicle remote from the first location.

7. A method comprising:
at a first stage that comprises a grated-light valve (GLV), the GLV comprised of a substrate and rows of reflective ribbons arranged over the substrate:
receiving a light beam from a light source; and
directing the light beam along one dimension to discrete input locations of a second stage; and
at the second stage that is comprised of a gimbaled mirror:
receiving the light beam from the first stage at the discrete input locations along the one dimension; and
directing the light beam through two dimensions to discrete output locations of the second stage to scan a three-dimensional space.

8. The method of claim 7, wherein the second stage is a fiber-optic bundle that comprises a plurality of transmit fiber-optic cables, each transmit fiber-optic cable comprising a transmit-input end and a transmit-output end, wherein:
the transmit-input end of each transmit fiber-optic cable is positioned at one of the discrete input locations; and
the transmit-output end of each transmit fiber-optic cable points toward one of the discrete output locations.

9. The method of claim 8, wherein the fiber-optic bundle further comprises a plurality of receive fiber-optic cables, each receive fiber-optic cable comprising a receive-input end and a receive-output end, wherein:
the receive-input end of each receive fiber-optic cable points towards a different location in the three-dimensional space; and
the receive-output end of each fiber-optic cable is coupled to a receiver.

10. The method of claim 7, wherein the gimbaled mirror that is operable to tilt perpendicular to the one dimension of the discrete input locations.

11. The method of claim 7, wherein the first stage further comprises a dynamic phase array that is operable to control a phase of a light wave emitted from the light source.

12. The method of claim 7, wherein the first stage is positioned at a first location inside an autonomous vehicle, and the second stage is positioned at one or more second locations inside the autonomous vehicle remote from the first location.

13. An apparatus comprising:
means for receiving at a first stage, including a grated-light valve (GLV) that includes a substrate and rows of reflective ribbons arranged over the substrate, a light beam from a light source;
means for directing the light beam along one dimension to discrete input locations of a second stage comprising a gimbaled mirror;
means for receiving the light beam from the first stage at the discrete input locations along the one dimension; and
means for directing the light beam through two dimensions to discrete output locations of the second stage to scan a three-dimensional space.

14. The apparatus of claim 13, wherein the second stage is a fiber-optic bundle comprising a plurality of transmit fiber-optic cables, each transmit fiber-optic cable comprising a transmit-input end and a transmit-output end, wherein:
the transmit-input end of each transmit fiber-optic cable is positioned at one of the discrete input locations; and
the transmit-output end of each transmit fiber-optic cable is operable to direct the light beam toward one of the discrete output locations.

15. The apparatus of claim 14, wherein the fiber-optic bundle further comprises a plurality of receive fiber-optic cables, each receive fiber-optic cable comprising a receive-input end and a receive-output end, wherein:
the receive-input end of each receive fiber-optic cable is operable to receive a reflected beam from one or more locations in the three-dimensional space; and
the receive-output end of each fiber-optic cable is coupled to a receiver.

16. The apparatus of claim 13, wherein the gimbaled mirror that is operable to tilt perpendicular to the one dimension.

17. The apparatus of claim 13, wherein the first stage further comprises a dynamic phase array that is operable to control a phase of a light wave emitted from the light source.

18. The apparatus of claim 13, wherein:
the first stage is positioned at a first location inside an autonomous vehicle; and
the second stage comprises a plurality of transmit-input ends and a plurality of transmit-output ends, wherein each transmit-output end is positioned at one of a plurality of second locations inside the autonomous vehicle remote from the first location.

* * * * *